Jan. 17, 1928.

S. L. KELLY 1,656,709

ELECTRIC OVEN

Filed Jan. 27, 1927

2 Sheets-Sheet 1

Inventor
Sherman L. Kelly
By Faust F. Crampton
Attorney

Jan. 17, 1928.

S. L. KELLY 1,656,709

ELECTRIC OVEN

Filed Jan. 27, 1927

2 Sheets-Sheet 2

Inventor
Sherman L Kelly
By Faust F. Crampton
Attorney

Patented Jan. 17, 1928.

1,656,709

UNITED STATES PATENT OFFICE.

SHERMAN L. KELLY, OF TOLEDO, OHIO, ASSIGNOR TO THE STANDARD ELECTRIC STOVE CO., OF TOLEDO, OHIO, A CORPORATION OF OHIO.

ELECTRIC OVEN.

Application filed January 27, 1927. Serial No. 163,926.

My invention has for its object to provide an efficient compact electrically heated oven that is particularly convenient for toasting, broiling, and otherwise heating food or articles of food of any kind.

The invention particularly provides a belt that is adapted to carry food or articles of food through the oven while they are being subjected to the temperature produced by electric heat elements. The invention also provides an arrangement of heat elements whereby the heat may be varied in quantity as may be desired to produce the desired heat treatment of the food that is passed through the oven on the belt. It also provides a support for the electric heat means which is so constructed that it will readily discharge or permit passage therethrough of any drippings or parts of food that may fall from the belt. It also provides a means whereby the electric heat element located below the portion of the belt on which the food is carried may be withdrawn from the oven for the purpose of cleaning the oven and the heat element that is withdrawn and thus enable maintenance of a clean, sanitary condition within the oven.

The invention may be contained in heating ovens of different forms and used for a variety of purposes. To illustrate a practical application of the invention, I have selected a structure containing the invention as an example of the different forms of structures that embody my invention and shall describe it hereinafter. The oven selected is shown in the accompanying drawings.

Figure 1:
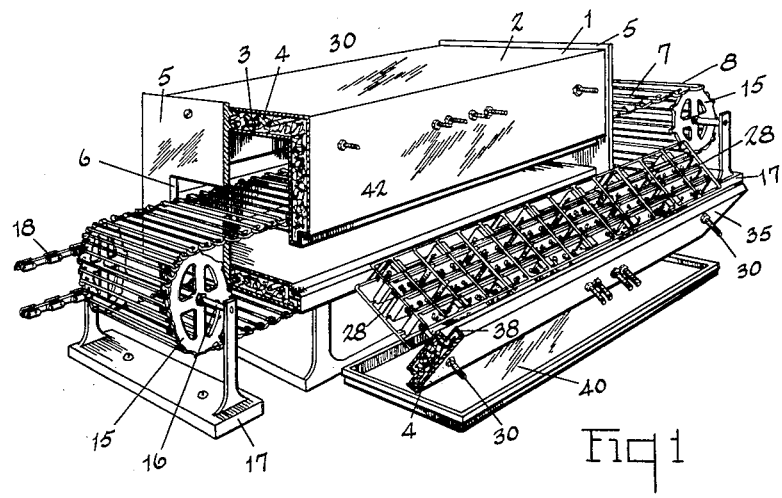
Figure 2:
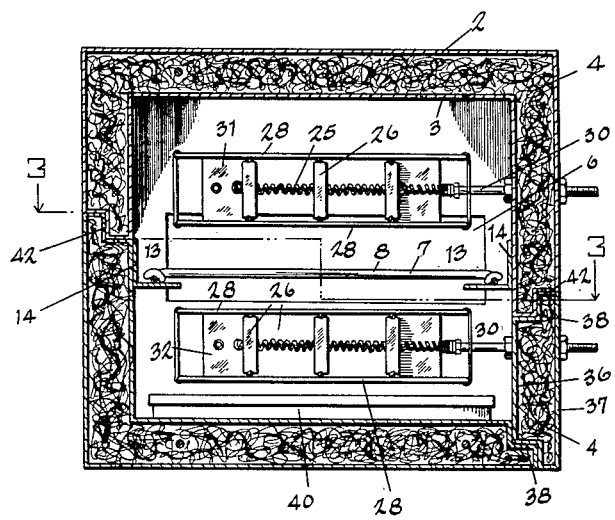
Figure 3:
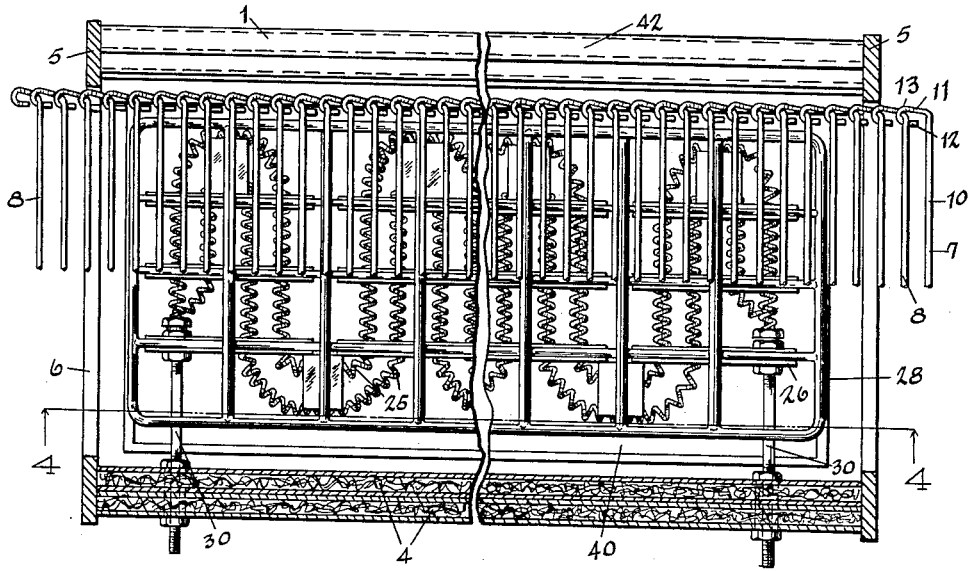
Figure 4:
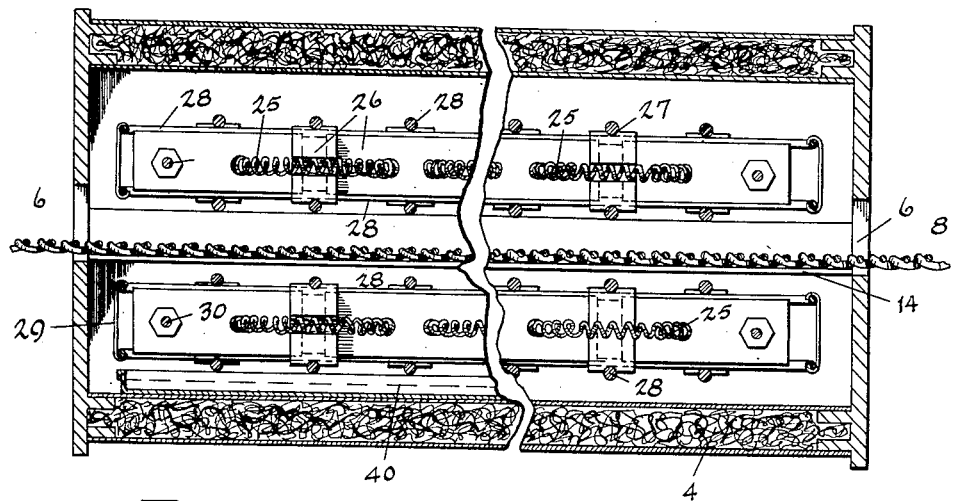

Fig. 1 of the drawings is a perspective view of the oven, a part being shown in section and a part being shown withdrawn from the oven in order to more fully illustrate the structure of the oven. Fig. 2 illustrates a transverse section of the oven shown in Fig. 1. Fig. 3 illustrates a longitudinal horizontal and broken section taken on the plane of the broken line 3—3 indicated in the Fig. 2. Fig. 4 is a view of a vertical section taken on the plane of the line 4—4 indicated in Fig. 3.

The oven selected as illustrative of structures containing the invention comprises an enclosed heat insulated compartment or chamber in which a belt is located. In the form of construction shown the oven 1 is provided with inner and outer walls 2 and 3 formed of sheet metal between which suitable heat insulating material 4 is located so as to heat insulate the interior of the oven. The ends of the side walls are closed by suitable plates 5 which, in the particular form of construction shown, are provided with slots 6 through which the upper portion or leg 7 of the belt 8 may move.

The belt 8 is formed of cross-bars that are located in spaced relation whereby heat radiated from an electric heat element located below the food carried by the belt, may directly heat the food and thus reduce the quantity of heat that would otherwise be used in heating the belt. It forms a continuous grid that reduces the amount of heat that would otherwise be lost from the portions of the belt located exterior to the oven. The invention thus provides for heating the food quite entirely by radiation from the heat elements although the food is also partially heated by convection of the current of the air and by conduction of the heat taken up by and transmitted from the bars of the belt that support the food.

The bars are connected together at their ends, the ends being bent to form connecting links. Each bar 10 has a portion 11 that is bent substantially at right angles to the body portion of the bar and a returned end portion 12 which locks into an adjoining bar substantially at the point where its portion 11 is also bent substantially at right angles to its body. The portion 11 is also bent so as to form a small arc as shown in Fig. 4 and the portion 12 conforms substantially to the same arc whereby end portions of each of the bars may lie close to a horizontal plane and yet permit the looped portions to engage and be engaged by the adjoining bars. Also the portions 13 between the parts 11 and 12 of each bar are curved about the portion 11 of an adjoining bar so as to fit closely thereto. These curved portions of the ends of the bars produce a belt that is well knitted together, that is, one that will maintain its form and so that the bars will not become disarranged in their interconnecting parts by any unusual load or weight that may be placed on the belt and will keep the bars in the desired relative positions at all times in the shipping, in the assembly, and also in the operation of the belt.

The interior of the oven is provided with angle bars or plates 14 that extend the length of the side walls of the oven and so as to support the edges of the belt as it is moved through the oven. The belt is supported and moved by means of sprocket wheels 15. The sprocket wheels 15 have teeth that fit the loops that are formed by the end portions 11, 12, and 13 of the rods. The sprocket wheels 15 are arranged in pairs and each pair is located on a suitable shaft 16 that is supported in a standard 17 to enable the movement of the belt through the oven 1. One pair of sprocket wheels 15 is driven by any suitable means, such as, by an electric motor or other motor means. A sprocket chain 18 is shown in the drawings as the means for driving one pair of the sprocket wheels 15 to drive the belt 8. The connection with the sprocket wheels 15 is such as to move the belt through the oven at the desired speed, preferably, sufficiently slow in order that the food may be properly heat treated and yet kept at a speed that is required for rapid delivery of the food, which, however, may be modified according to the arrangement and connection of the electric heat elements used in heating the oven.

The oven may be supported in any manner so as to permit the belt to pass beneath the oven upon delivery of the food. Also means is provided for heating the food both below and above. The electric heat elements extend over large areas of the belt and are located in close proximity to the portion of the belt within the oven and, moreover, is so constructed as to cause the food to be heated by radiation from the heat elements. The heat elements are, preferably, formed of resistance wires 25 that are supported in porcelain slabs or parts 26 having grooves 27. The slabs or porcelain parts form an electrical insulation for the resistance wire 24 and the grooves 27 provide a means for securely connecting together the walls or porcelain parts 26 by means of the wire frames 28 that are located on the upper and lower edges of the electrical insulating parts 28. The frames are secured together by means of suitable cross pieces 29 that are welded to the frames and thus the electrical insulating parts 26 are secured together. The heat element is supported by means of bolts 30 that extend through one of the side walls of the oven, preferably through the front side wall. The resistance wires are connected to the bolts 30 and the bolts 30 thus provide suitable binding poles or terminals for connecting the resistance wires with an external circuit. The resistance wires of the electric heat elements 31 and 32 may be subdivided into parts and the parts distributed within the supporting frames as may be desired and the parts may also be connected with the terminals located at the ends of the bolts 30 and so that one or more of the parts of the resistance wires of each heat element may be connected and, if desired, may be connected in series or parallel, as may be required to properly manipulate and obtain the best results in the operation of the oven.

The lower heat element 32 is, preferably, made removable since it is located below the belt 8 and will invariably receive droppings from the food that is carried by the belt. In the form of construction shown the lower element 32 is connected to a removable section 35 of one of the side walls of the oven by means of the bolts 30 by which the lower heat element 32 is supported. The section 35 is provided with walls 36 and 37, the space between which is filled with the heat insulating material 4. The upper and lower edges of the section 35 are formed step shaped and the edges of the portions of the wall that the section 35 forms a part of, are also made step shaped in order to tightly close the wall along the edge of the removable section and reduce the loss of heat from the interior of the oven. The lower edge of the section 35 is, preferably, located below the lower side of the interior of the oven. Thus when the section 35 is removed the lower heat element 32 will be withdrawn therewith from the oven, which leaves a space through the side wall that will permit cleaning the interior of the oven and particularly the lower side of the oven. The heat elements being made in the form of open frames, permits the food to drop through the lower frame to the bottom of the oven, and permits cleaning of the heat elements. If desired, a pan 40 may be located on the bottom of the oven which will collect any material that is dropped from the food through the belt and the heat element 32. The pan 40 may also be removed when the section 35 has been removed.

The oven is also formed, preferably, in two parts which fit one within the other, one line of division being along stepped portions 42, and the other line of division being along the stepped portion 38, that is, along the upper edge of the section 35. These stepped portions prevent the escape of heat through the line of contact between the upper and lower parts of the oven.

I claim:

1. In an electric oven, a substantially closed container having heat insulating walls, a belt formed of spaced metal bars and having connected end portions and forming a continuous grid and located in the container, means for moving the belt, electric heat elements located above and below the belt, each heat element comprising resistance wires and open frames for supporting the resistance wires for permitting droppings from the material on the belt to pass through the lower of the heat elements and for heating the material on the belt by direct radiation from both of the heat elements.

2. In an electric oven, a substantially closed container having heat insulating walls, a belt formed of spaced metal bars and having connected end portions and forming a continuous grid and located in the container, means for moving the belt, electric heat elements located above and below the belt, a wall of the container having a removable section located along the lower portion of the wall, and the lower heat element supported by the said section.

3. In an electric oven, a substantially closed container having heat insulating walls, a belt formed of spaced metal bars and having connected end portions and forming a continuous grid and located in the container, means for moving the belt, electric heat elements located above and below the belt, a wall of the container having a removable section located along the lower portion of the wall, the lower heat element supported by the said section, each heat element comprising resistance wires, open frames for supporting the resistance wires for permitting droppings from material on the belt to pass through the lower of the heat elements.

In witness whereof I have hereunto signed my name to this specification.

SHERMAN L. KELLY.